United States Patent
Yui et al.

(10) Patent No.: US 7,401,832 B2
(45) Date of Patent: Jul. 22, 2008

(54) OPENING AND CLOSING APPARATUS OF VEHICLE

(75) Inventors: Kenji Yui, Okazaki (JP); Katsuhisa Ishihara, Okazaki (JP)

(73) Assignees: Mitsubishi Jidosha Engineering Kabushiki Kaisha, Okazaki-Shi (JP); Mitsubishi Jidosha Kogyo K.K., Tokyo (JP)

( * ) Notice: Subject to any disclaimer, the term of this patent is extended or adjusted under 35 U.S.C. 154(b) by 0 days.

(21) Appl. No.: 11/517,345

(22) Filed: Sep. 8, 2006

(65) Prior Publication Data

US 2007/0057525 A1 Mar. 15, 2007

(30) Foreign Application Priority Data

Sep. 14, 2005 (JP) ............................. 2005-266367
Sep. 14, 2005 (JP) ............................. 2005-266369

(51) Int. Cl.
*B60J 5/10* (2006.01)

(52) U.S. Cl. ............. 296/57.1; 296/146.8; 296/146.11; 49/502

(58) Field of Classification Search ................. 296/51, 296/57.1, 146.8, 146.11; 49/502
See application file for complete search history.

(56) References Cited

U.S. PATENT DOCUMENTS 4,763,945 A * 8/1988 Murray ..................... 296/57.1
5,765,895 A * 6/1998 Rose et al. ................... 296/76
6,196,617 B1* 3/2001 Beck ..................... 296/146.11
6,905,157 B2* 6/2005 Kang et al. ................... 296/55
2002/0074818 A1* 6/2002 Presley ...................... 296/57.1
2006/0125284 A1* 6/2006 Kristl ..................... 296/146.11

FOREIGN PATENT DOCUMENTS

JP 4-114814 U 10/1992
JP 6-5488 Y2 2/1994

* cited by examiner

*Primary Examiner*—Jason S Morrow
(74) *Attorney, Agent, or Firm*—Birch, Stewart, Kolasch & Birch, LLP

(57) ABSTRACT

An opening and closing apparatus of a vehicle includes, an opening and closing member for opening and closing an opening portion of a vehicle body; a lower hinge for pivotably supporting the opening and closing member from below; and a cover member disposed below the opening and closing member placed in a closed state for covering a pivot support portion of the lower hinge from behind, wherein when the opening and closing member is in an open state, a pivoting portion pivotably supported by the pivot support portion straddles the cover member, the opening and closing member is located rearwardly of the cover member, and an uppermost site of the pivoting portion is located at a position not higher than an upper surface of the opening and closing member.

4 Claims, 11 Drawing Sheets

OPENING AND CLOSING APPARATUS OF VEHICLE

BACKGROUND OF THE INVENTION

1. Field of the Invention

This invention relates to an opening and closing apparatus of a vehicle. This apparatus is preferred, for example, as an opening and closing apparatus for a door in a rear portion of a vehicle, which is divided into an upper door and a lower door opened upward and downward in a separated manner.

2. Description of the Related Art

In a vehicle such as an RV (recreational vehicle), an opening portion of a rear door is rendered large so that large luggage can be loaded, and the rear door is itself large. In opening the rear door, therefore, a wide space is required behind the vehicle in order to ensure an opening and closing range. To avoid such a space problem, a rear portion of a vehicle 101 is divided into an upper door 102 and a lower door 103 which are opened upward and downward in a separated manner, as shown in FIG. 10A. Since the upper door 102 and the lower door 103 are opened upward and downward in a separated manner, the opening and closing range of the upper door 102 and the lower door 103 can be rendered narrow, thus decreasing a necessary space behind the vehicle.

Japanese Utility Model Application Laid-Open No. 1992-114814 and Japanese Utility Model Publication No. 1994-5488 are examples of the related art.

In the lower door 103 of the rear door of the divided type, structures as shown in FIGS. 10B and 10C are usually conceivable as mounting structures for hinges which support the lower door 103 pivotably. In the mounting structure of FIG. 10B, for example, an arm 106 of a hinge 105 is attached to the lower end side of a lower door 103A put in a closed state, and a base 107 supporting the arm 106 pivotably is mounted on a vehicle body 101. In other words, the arm 106 is mounted on the front surface side (the surface facing the vehicle body 101) of a lower door 103B placed in an open state. In the mounting structure of FIG. 10C, on the other hand, an arm 106 of a hinge 105 is mounted on the front surface side (the surface facing the vehicle body 101) of a lower door 103A placed in a closed state. In other words, the arm 106 is mounted on the upper surface side of a lower door 103B placed in an open state.

In each of the above-mentioned hinge mounting structures, a large clearance S is required between the upper end of a bumper 104 and the lower end of the lower door 103A placed in the closed state, in order to secure a space for the lower door 103B placed in the open state. This lowers the degree of freedom of a design for this portion, and results in poor appearance. Moreover, the position of mounting of the arm 106 is remote from the position of center of gravity G of the lower door 103 in a side view, thus requiring a high mounting strength for the portion where the arm 106 is mounted.

Furthermore, as shown in FIG. 11A, if a rear portion of a vehicle 101 is divided into an upper door 102 and a lower door 103 which are opened upward and downward in a separated manner, a wire 111 is connected to one end of the lower door 103. In the open state, only the wire 111 keeps the open state and supports the lower door 103. If luggage 112 is loaded and unloaded with the use of such a structure, the luggage 112 may be temporarily placed on the lower door 103 only. In this case, under an unexpectedly heavy load, the wire 111 may be detached from the vehicle body, or may be disconnected from the lower door, or may be broken, as shown in FIG. 11B. As a result, the lower door may fall off, or the luggage 112 may be dropped, injuring an operator.

The present invention has been accomplished in light of the above-described problems with the earlier technologies. It is an object of the invention to provide an opening and closing apparatus of a vehicle, which does no harm to appearance or loading and unloading work for luggage while ensuring the strength and load bearing properties of a mounting portion.

SUMMARY OF THE INVENTION

According to an aspect of the invention, a space for the opening and closing member in the open state need not be secured between the opening and closing member (lower door) and the cover member (bumper). Thus, the degree of freedom of design for the rear portion of the vehicle can be increased.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

An opening and closing apparatus of a vehicle according to the present invention will be described in detail with reference to FIGS. 1 to 9.

EMBODIMENT 1

Figure 1:
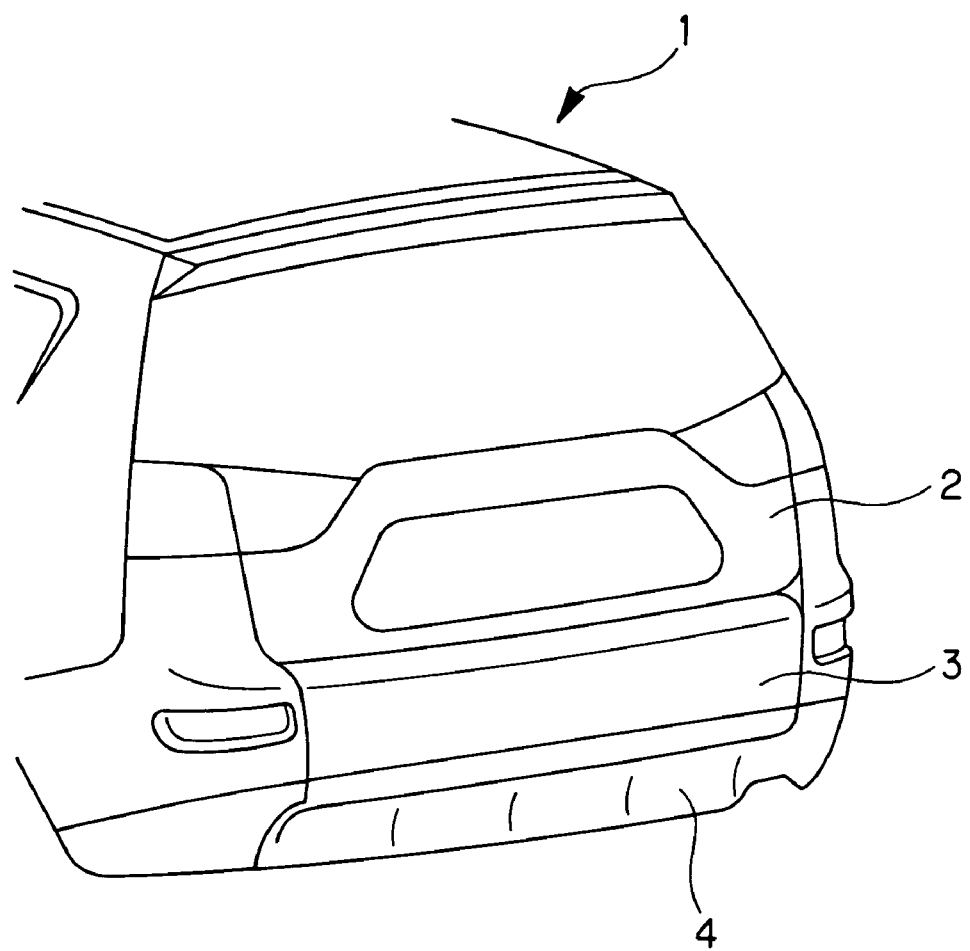
FIG. 1 is a schematic view showing a rear portion of a vehicle.
Figure 2:
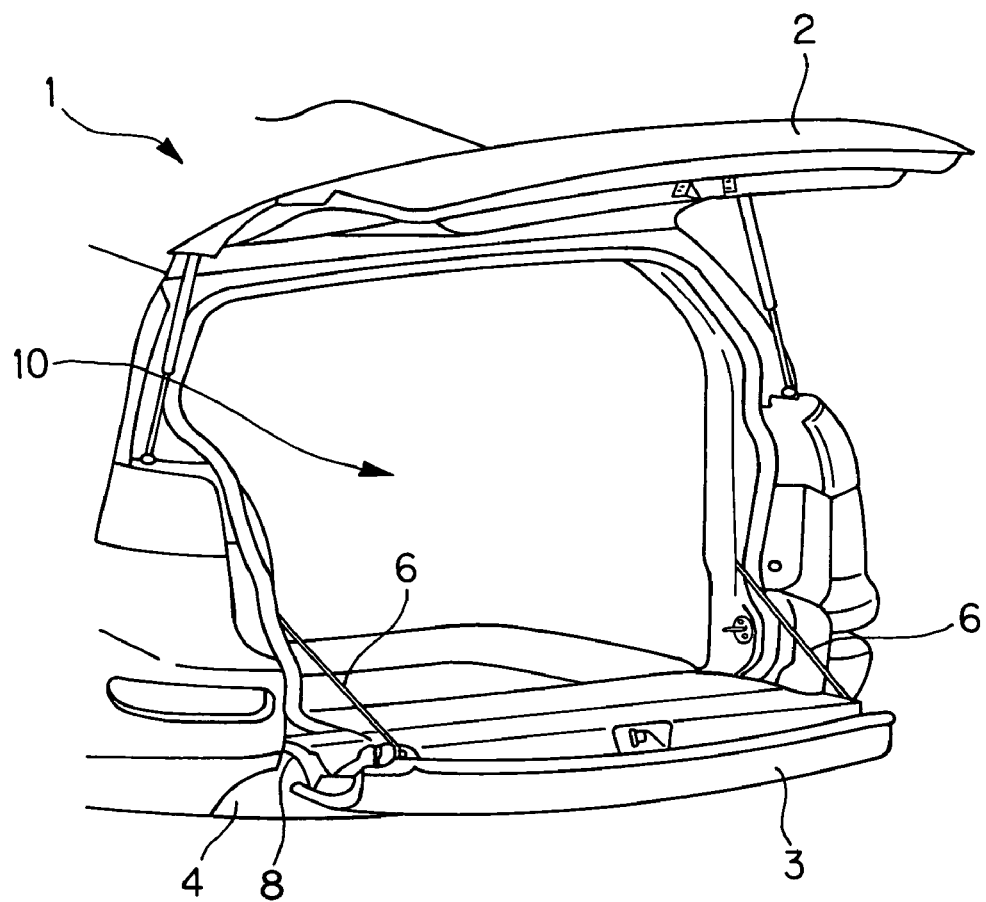
FIG. 2 is a schematic view showing a state in which an upper door and a lower door are opened in the rear portion of the vehicle.
Figure 3:
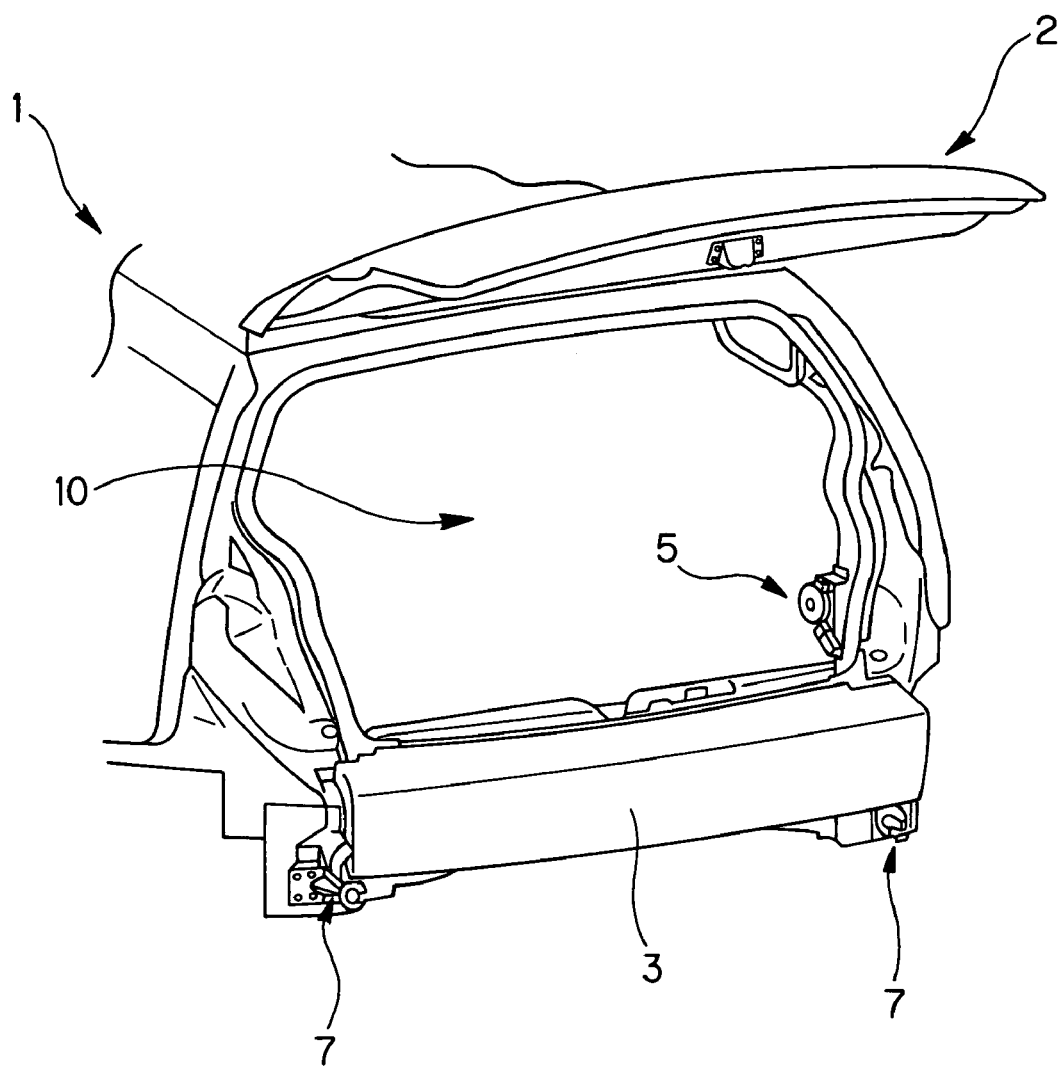
FIG. 3 is a schematic view showing a state in which the upper door is opened in the rear portion of the vehicle, with some garnishes, etc. being removed for illustrating an internal structure.
Figure 4:
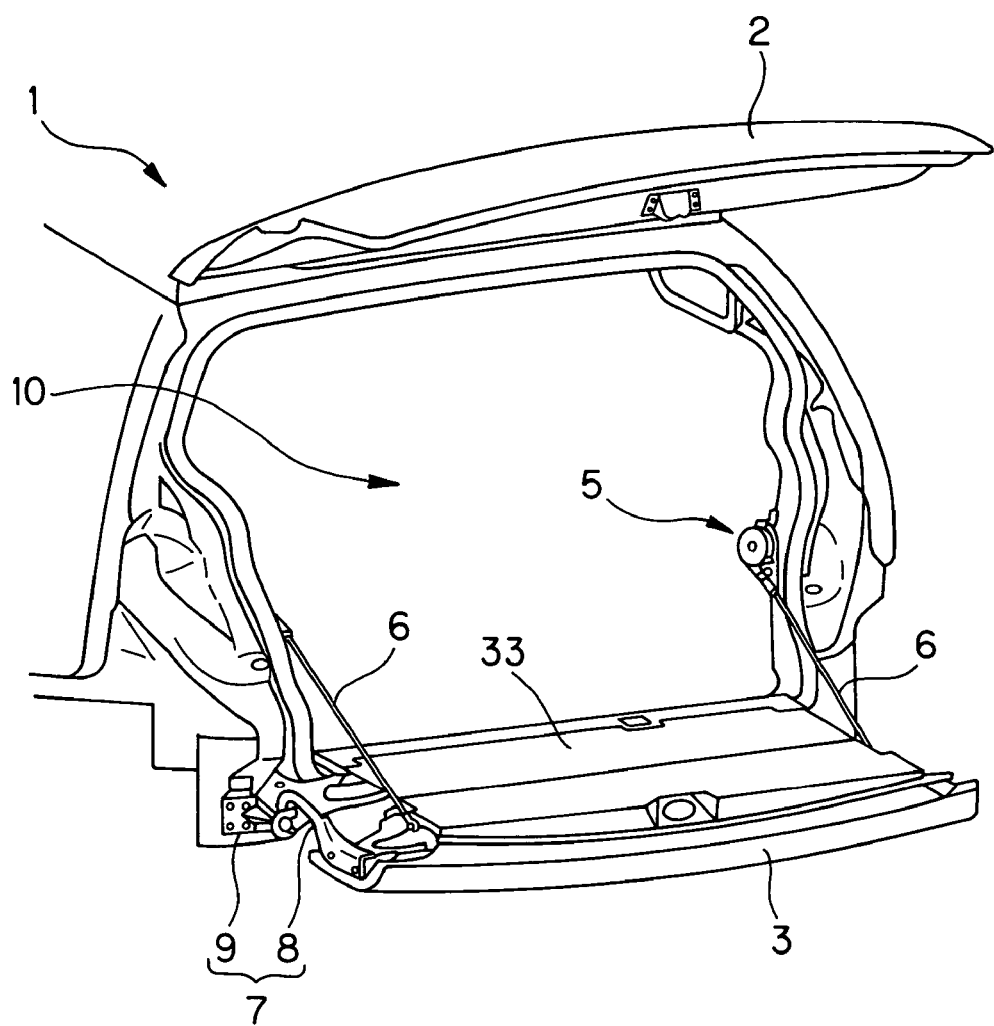
FIG. 4 is a schematic view showing a state in which the upper door and the lower door are opened in the rear portion of the vehicle, with some garnishes, bumper, etc. being removed for illustrating the internal structure.
Figure 5A:
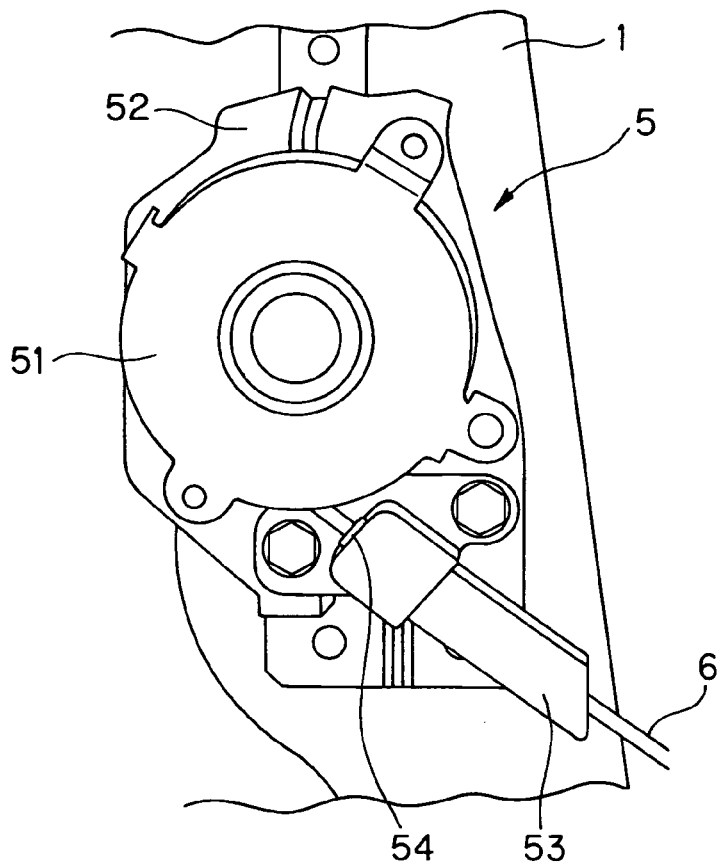
FIGS. 5A and 5B are perspective views of a reel and a hinge according to the present invention.
Figure 5B:
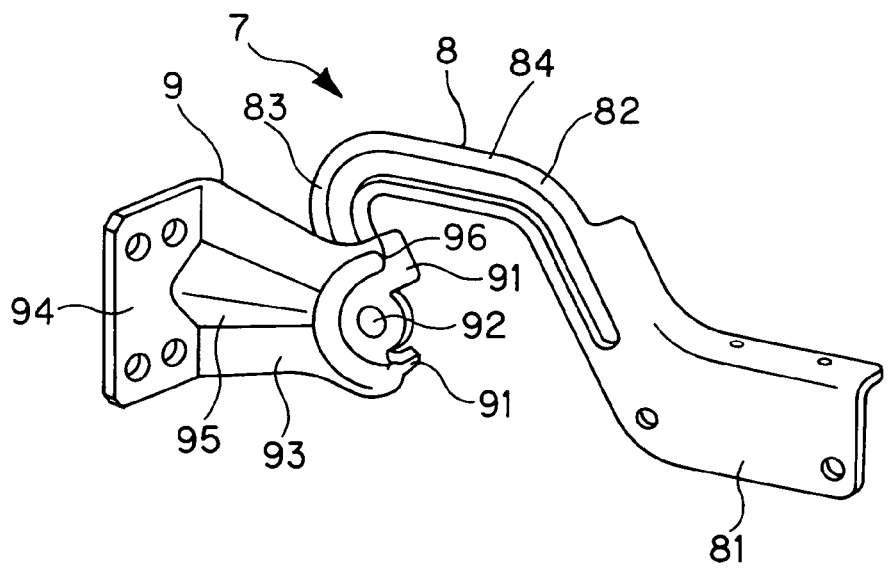
Figure 6A:
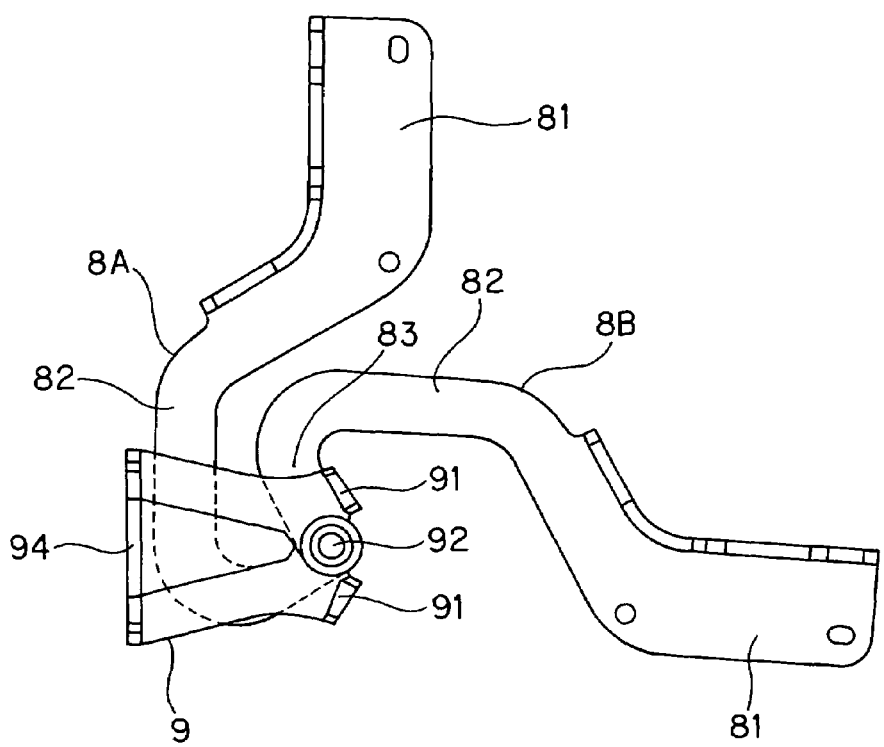
FIGS. 6A and 6B are views illustrating the actions of the hinge according to the present invention.
Figure 6B:
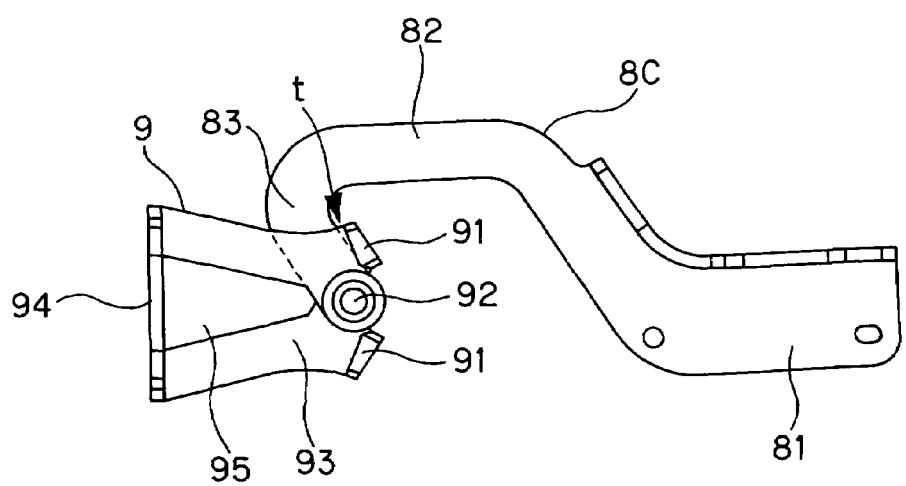
Figure 7:
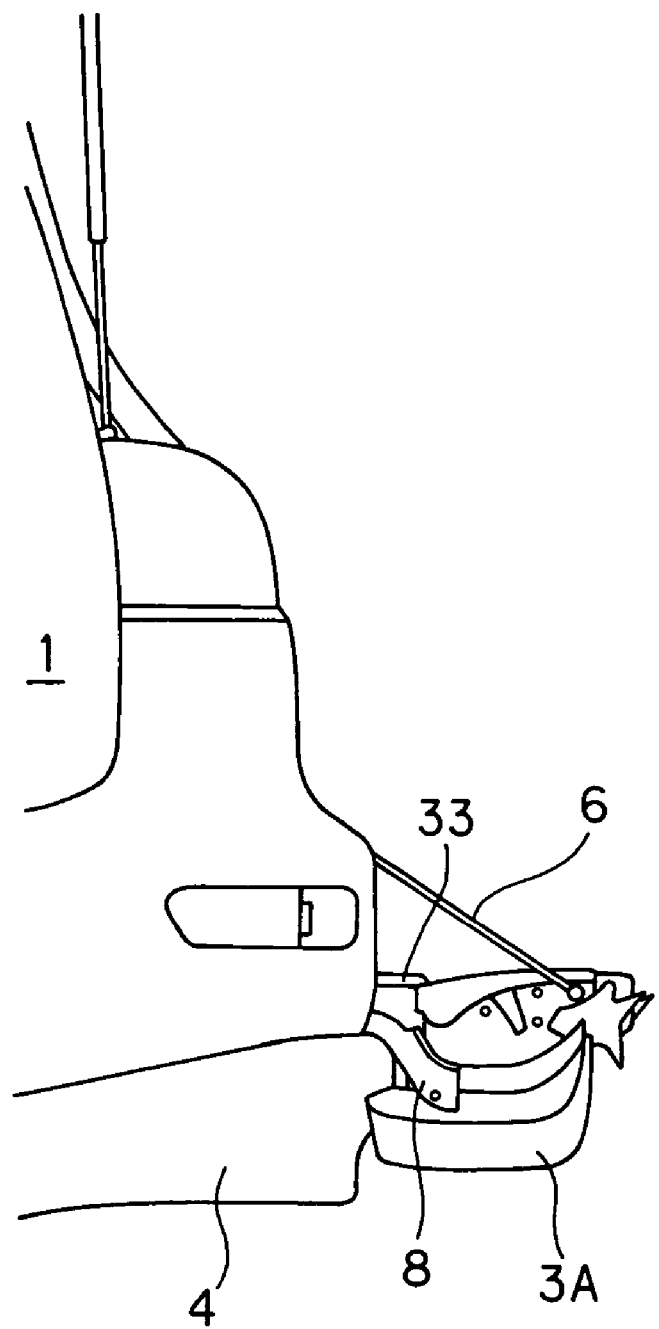
FIG. 7 is an external appearance view, as a side view, showing the arrangement relationship between the hinge and other members according to the present invention.
Figure 8:
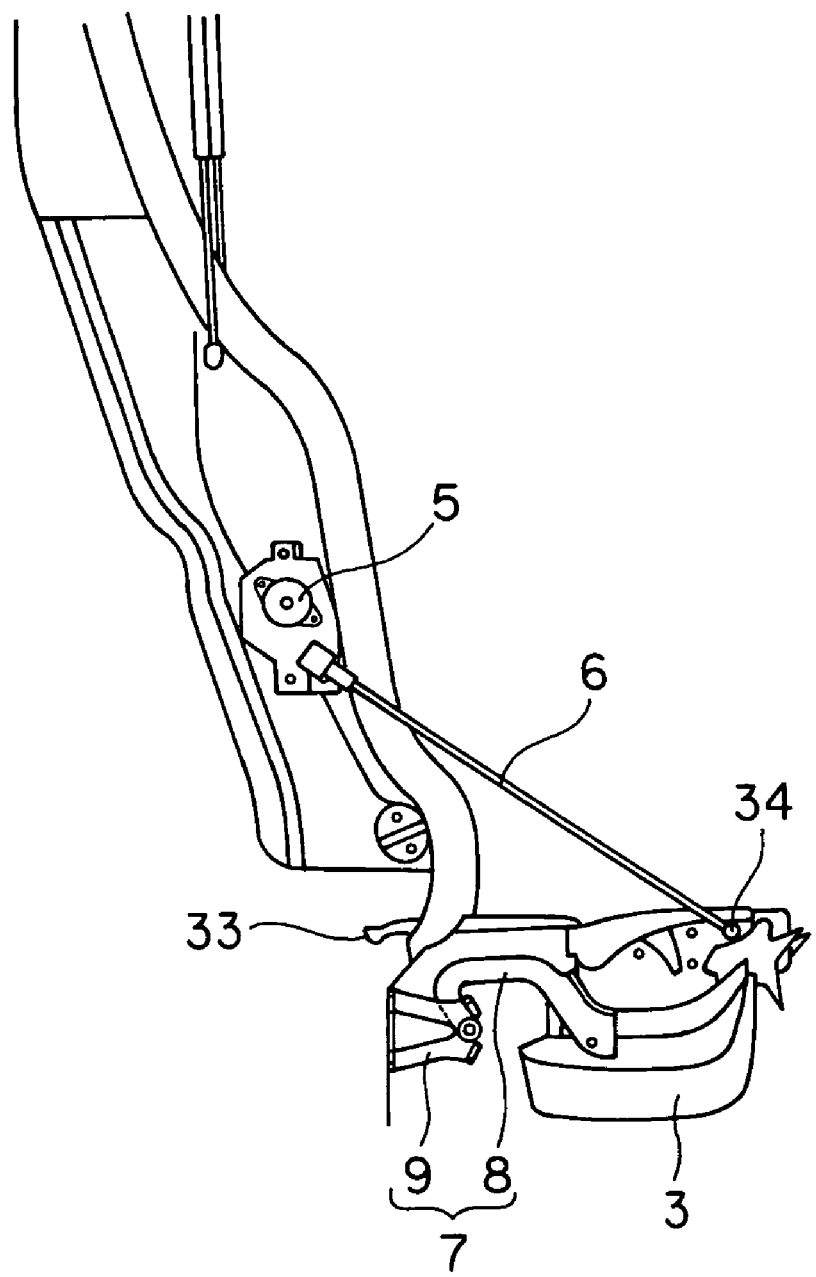
FIG. 8 is a view illustrating the arrangement relationship among respective members in a state in which the upper door and the lower door are opened in the rear portion of the vehicle.
Figure 9:
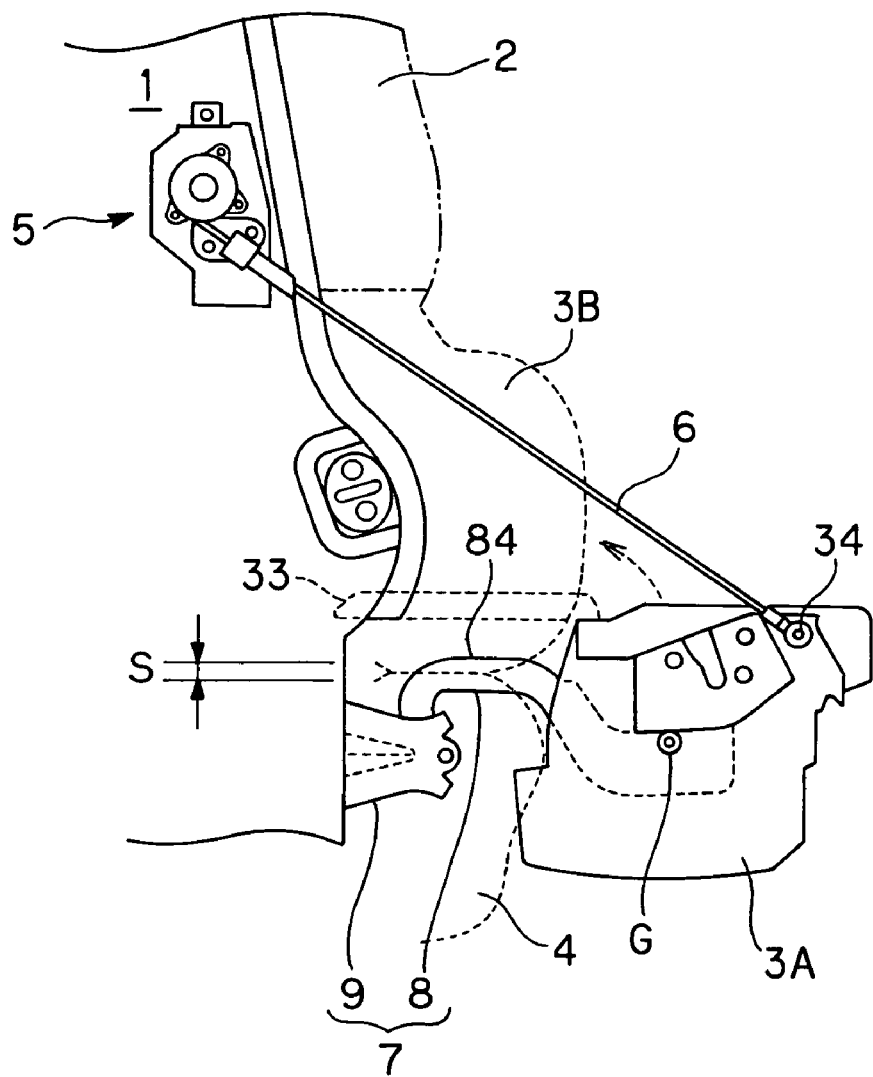
FIG. 9 is a side view, in perspective, showing the arrangement relationship between the hinge and other members according to the present invention.
Figure 10A:
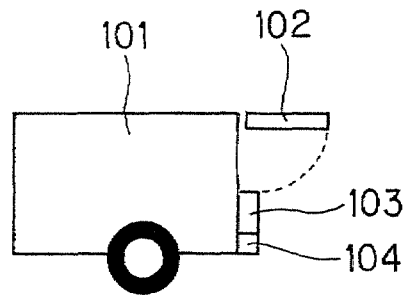
FIGS. 10A to 10C are views illustrating the problems of a conventional opening and closing apparatus of a vehicle.
Figure 10B:
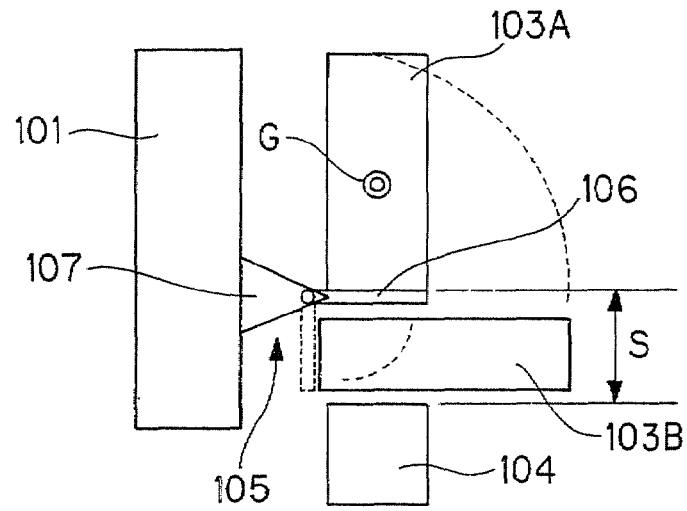
Figure 10C:
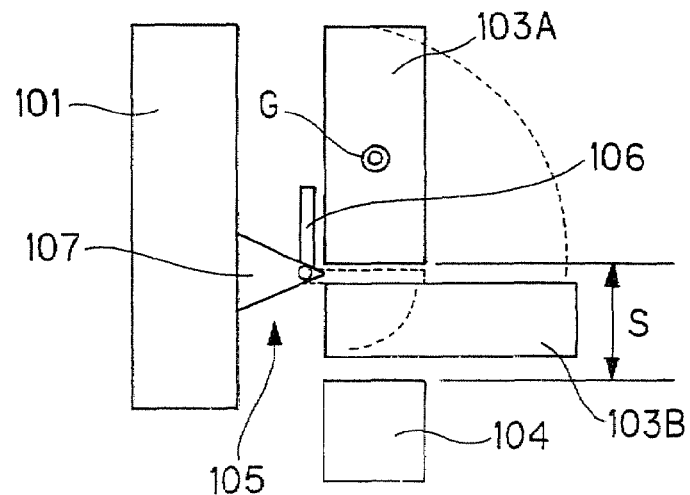
Figure 11A:
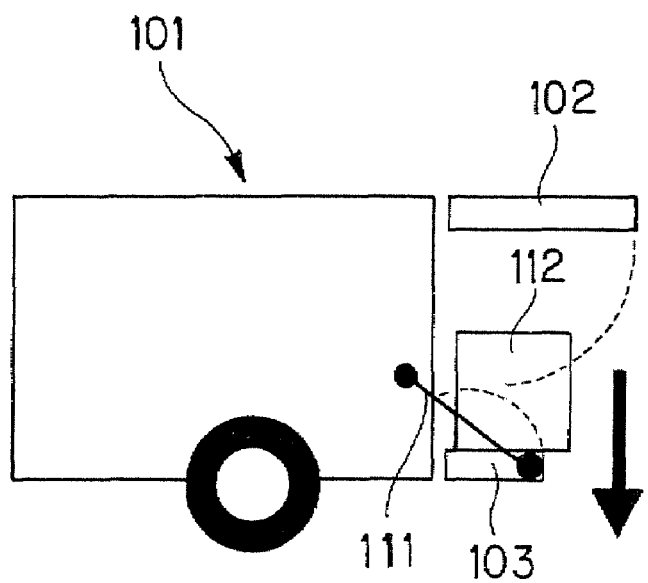
FIGS. 11A and 11B are views illustrating the problems of a conventional opening and closing apparatus of a vehicle.
Figure 11B:
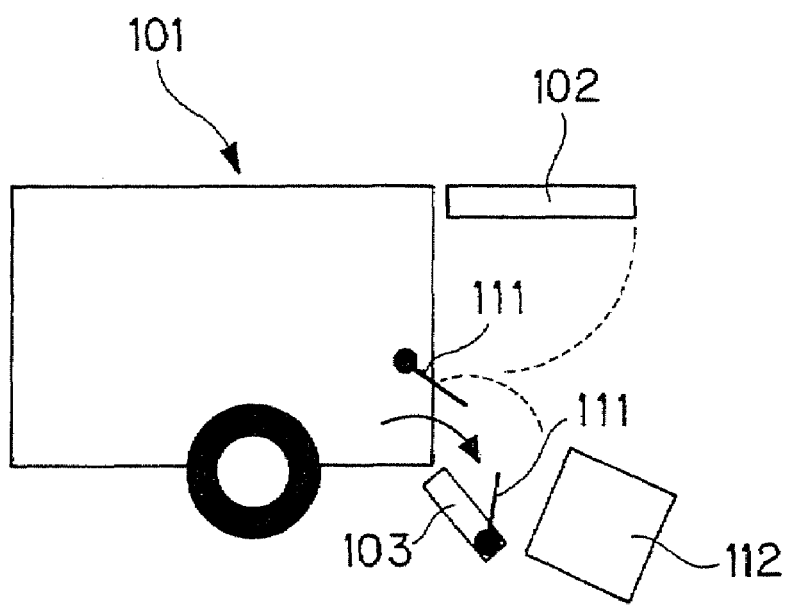

FIG. 1 is a schematic view showing a rear portion of a vehicle. FIG. 2 is a schematic view showing a state in which an upper door and a lower door are opened in the rear portion of the vehicle. FIG. 3 is a schematic view showing a state in which the upper door is opened, with some garnishes, a bumper, etc. being removed for illustrating an internal structure. FIG. 4 is a schematic view showing a state in which the upper door and the lower door are opened, with some garnishes, bumper, etc. being removed for illustrating the internal structure. FIGS. 5A and 5B are perspective views of a reel and a hinge according to the present invention. FIGS. 6A and 6B are, views illustrating the actions of the hinge according to the present invention. FIG. 7 is an external appearance view, as a side view, showing the arrangement relationship between the hinge and other members according to the present invention. FIG. 8 is a view illustrating the arrangement relationship among respective members in a state in which the upper door and the lower door are opened in the rear portion of the vehicle. FIG. 9 is a side view, in perspective, showing the arrangement relationship between the hinge and other members according to the present invention.

As shown in FIGS. 1 to 4, a rear portion of a vehicle body 1 has a structure in which an upper door 2 opens upward, and a lower door 3 (opening and closing member) opens downward, in a separated manner. The present invention can be configured, because of the use of an opening and closing apparatus of a vehicle according to the invention, such that the lower door 3 and a bumper 4 below the lower door 3 have an integral appearance.

The opening and closing apparatus of a vehicle according to the present invention is equipped with the lower door 3 openably and closably mounted on the vehicle body 1 via a hinge 7 (arm 8 (pivoting portion), base 9 (pivot support portion)), and the bumper 4 (cover member) disposed below the lower door 3 in a closed state for covering the base 9 of the hinge 7 from behind. The hinge 7 has the base 9 mounted on the vehicle body 1, and the arm 8 supported by the base 9 to be pivotable in a predetermined range. The lower door 3 is supported by the arm 8 in each of its opposite side end portions.

A wire 6 having one end attached to the vehicle body 1 and the other end attached to the lower door 3 is also provided. When the lower door 3 is brought to an open state, the wire 6 supports the upper surface of the lower door 3 nearly horizontally. A reel 5 (take-up means) for taking up the wire 6 is disposed in the vehicle body 1. When the lower door 3 is to be brought to a closed state, the wire 6 is automatically taken into the reel 5, and accommodated in the interior of the reel 5. By so having the wire 6 of the take-up type, the accommodation of the wire 6 can be performed compactly, and the wire 6 can be prevented from being entangled with the vehicle body or the lower door 3 when the lower door 3 is opened or closed.

The hinge 7 has a stopper 91 for restraining the rotation of the arm 8 to restrict the opening of the lower door 3. In the lower door 3 in the open state, if a load of a predetermined value or lower is imposed on the lower door 3, the load is supported by the wire 6 alone. If a load of a higher value than the predetermined value is imposed on the lower door 3, the load is supported by the wire 6 and the stopper 91. The details of these features will be described later.

The configurations of the reel 5 and the hinge 7 will be described in detail using FIGS. 5A, 5B and FIGS. 6A, 6B. FIG. 5A is a perspective view of the reel 5, and FIG. 5B is a perspective view of the hinge 7 when the lower door 3 is in an open state. FIGS. 6A, 6B are views illustrating the actions of the hinge.

As stated earlier, the hinge 7 consists of the arm 8 and the base 9. The arm 8 consists of a support portion 81 for supporting the opposite side end portion of the lower door 3, a bending portion 82 bent (curved) toward the upper side of the vehicle body, and a restraint portion 83 supported by the base 9 and making a rotating motion restrained by the stopper 91.

The bending portion 82 is provided to have a bent portion between the pivot support portion journaled at the base 9 and the support portion 81. The bending portion 82 has such a shape that when the lower door 3 is open, the bending portion 82 straddles the bumper 4, and the lower door 3 is disposed behind the bumper 4 in the longitudinal direction of the vehicle body. The arm 8 is mounted on a side surface in the vehicle width direction of the lower door 3 such that the uppermost site of the hinge 7, namely, the uppermost site 84 of the arm 8, is located at a lower position than the upper surface of the lower door 3 placed in the open state (see FIG. 5B).

The base 9 comprises the stopper 91 for restraining the rotating motion of the arm 8, namely, for restricting the opening of the lower door 3, a rotating shaft portion 92 for supporting the arm 9 pivotably, a holding portion 93 for holding the stopper 91 and the rotating shaft portion 92, and a fixed portion 94 fixed to the vehicle body 1. In the base 9, the holding portion 93 is provided with a bend 95 in order to downsize the base 9 and maintain its strength.

Next, the actions of the hinge 7 for supporting the lower door 3 to be openable and closable, concretely, the actions of the arm 8, will be described with reference to FIGS. 6A and 6B. In FIG. 6A, an arm 8A represents the position of the arm when the lower door 3 is closed, and an arm 8B represents the position of the arm when the lower door 3 is fully open. In FIG. 6B, an arm 8C represents an open state during ordinary use (indicating a position moved toward the closed state by a predetermined angle with respect the fully open state).

As shown in FIG. 6A, when the lower door 3 is closed, the arm 8 supporting the lower door 3 takes the position of the arm 8A. At this time, the restraint portion 83 and the bending portion 82 of the arm 8 are accommodated in the region of the holding portion 93 of the base 9, and the support portion 81 is located-above the holding portion 93 nearly vertically. That is, when the lower door 3 is closed, the restraint portion 83 and the bending portion 82 of the arm 8 are accommodated in the interior of the bumper 4 covering the base 9. The lower door 3 supported by the support portion 81 is located above the bumper 4 to have an appearance nearly integral with the bumper 4, as shown in FIG. 1.

As shown in FIG. 6B, when the lower door 3 is open, the arm 8 assumes the position of the arm 8C. Here, the bending portion 82 of the arm 8 is located to be above the holding portion 93 of the base 9 and rearward in the vehicle (rightward in FIG. 6B). The support portion 81 is located further rearwardly of the bending portion 82 and nearly horizontally. That is, when the lower door 3 is open, the bending portion 82 of the arm 8 straddles the bumper 4, and the lower door 3 supported by the support portion 81 is located rearwardly of the bumper 4 in the longitudinal direction of the vehicle body.

Next, the arrangement relationship between the hinge 7 and other members will be described using FIGS. 7 and 9. FIGS. 7 and 9 are side views of the vehicle shown in FIGS. 2 and 4, clarifying the arrangement of the respective members.

As shown in FIGS. 7 and 9, the lower door 3 in the open state (see the lower door 3A) straddles the bumper 4 and opens to the rear of the vehicle, because of the shape of the arm 8 of the hinge 7. Thus, a space for accommodation of the lower door 3 in the open state need not be ensured between the bumper 4 and the lower door 3. With the lower door 3 in the closed state (see the lower door 3B), the clearance between the upper end of the bumper 4 and the lower end of the lower door 3B is minimal, so that the lower door 3 and the bumper 4 can together form an integral appearance, and increase the degree of freedom of design.

As shown in FIGS. 7 and 9, when the lower door 3 is brought to the open state (see the lower door 3A), the upper surface of the lower door 3 supported by the hinge 7 (arm 8, base 9) becomes nearly horizontal, and the wire 6 is paid out from the reel 5. Thus, the lower door 3 is supported by the wire 6 fixed to a fixing point 34 in an upper end portion of the lower door 3. The fixing point 34 for the wire 6 on the lower door 3 is located in proximity to a mounting portion of the arm 8 on the lower door 3. Furthermore, the position of mounting of the arm 8 on the lower door 3 is also in the neighborhood of the position of center of gravity G of the lower door 3 in the side view. Such a configuration makes it possible to ensure the strength of a portion where load is concentrated, concretely, the mounting portion of the arm 8 or the portion surrounding the fixing point 34 of the wire 6. With the lower door 3 in the open state, a sheet member 33 covers the lower door 3 and the floor surface of the vehicle body 1 in order to facilitate the horizontal movement of luggage. Here, the uppermost site 84 of the arm 8 is located at a lower position than the upper surface of the lower door 3 in the open state, namely, below the sheet member 33. Thus, the arm 8 does not jut out over the sheet member 33. Consequently, a large opening portion can be secured for the lower door 3.

Next, the configuration of the stopper 91, which is provided in the hinge 7 and restrains the rotation of the arm 8 to restrict the opening of the lower door 3, will be described in detail with reference to FIGS. 5A, 5B, 6A, 6B and 8. FIG. 8 corresponds to a side view of the vehicle shown in FIG. 4, designed to elucidate the arrangement of the respective members.

As shown in FIG. 8, when the lower door 3 is brought to an open state under ordinary conditions (where load has a predetermined value or lower), the upper surface of the lower door 3 is nearly horizontal, and the own weight of the lower door 3 and luggage with up to a predetermined load are supported by the wire 6 fixed to the fixing point 34 in the upper end portion of the lower door 3. Here, the amount of the wire 6 paid out is regulated by a stop 54, a clearance t is formed between the restraint portion 83 of the arm 8 and the stopper 91, and only the wire 6 supports the lower door 3, although details will be offered in FIGS. 5A, 5B and 6A, 6B. With the lower door 3 in the open state, the sheet member 33 covers the lower door 3 and the floor surface of the vehicle body 1 in order to facilitate the horizontal movement of luggage.

As shown in FIG. 5A, the reel 5 includes a reel body 51 for taking up the wire 6, a bracket 52 fixed to the vehicle body 1 for holding the reel body 51, and a guide 53 fixed to the bracket 52 for guiding along a paying-out direction the wire 6 paid out from the lower side of the reel body 51. In the reel 5, when the wire 6 is to be taken up, namely, when the lower door 3 is to be closed, the wire 6 is automatically taken into the interior of the reel body 51 by the force of a spring member disposed within the reel body 51. When the wire 6 is to be paid out, namely, when the lower door 3 is to be opened, the wire 6 is paid out of the reel body 51 by the own weight of the lower door 3. When the upper surface of the lower door 3 has become nearly horizontal, the stop 54 mounted on the wire 6 is restrained by an end portion of the guide 53, so that the lower door 3 in the open state is supported by the wire 6. If a heavier load than the predetermined load is imposed on the lower door 3, the stop 54 mounted on the wire 6 is displaced to increase the amount of paying-out of the wire 6 slightly, thereby rendering the lower door 3 fully open. As a result, the lower door 3 in the fully open state is supported by the wire 6 and the stopper 91 (to be described later). Here, the stop 54 functions to regulate the amount of the wire 6 paid out.

The base 9 is provided with the stopper 91 at a position close to the rotating shaft portion 92 supporting the arm 8. To downsize the base 9 and maintain its strength, a bend 96 is provided in the stopper 91, as the bend 95 is provided in the holding portion 93.

As shown in FIG. 6A, when the lower door 3 is closed (see FIGS. 1 and 3), the arm 8 of the hinge 7, which supports the lower door 3 to be pivotable, takes the position of the arm 8A. As shown in FIG. 6B, when the lower door 3 is opened (see FIGS. 2 and 4), the arm 8 of the hinge 7 takes the position of the arm 8C. At this time, the lower door 3 is fixed at the fixing point 34 for the wire 6, and the opening of the lower door 3 is restricted by the amount of paying-out of the wire 6 controlled by the stop 54. Thus, the arm is located at a position moved toward the closed state by a predetermined angle with respect the fully open state, so that the slight clearance t is formed between the stopper 91 and the restraint portion 83 of the arm 8C. Consequently, when luggage with a predetermined load or less within an expected range is loaded or unloaded, the lower door 3 is supported only by the wire 6, even if load is imposed on the lower door 3.

When luggage heavier than the predetermined load beyond the expected range is loaded or unloaded, the stop 54 on the wire 6 is displaced, if load is imposed on the lower door 3. As shown in FIG. 6A, the arm 8 is rotated to the position of the arm 8B (fully open state) to bring the restraint portion 83 into contact with the stopper 91. Thus, the lower door 3 is supported by the wire 3 and the stopper 91.

In the opening and closing apparatus according to the present invention, as described above, the stopper 91 for restraining the rotation of the arm 8 is provided in the base 9 of the hinge 7. Thus, even if head load is imposed on the lower door 3, the stopper 91 supports the arm 8, i.e., the lower door 3, before the wire 6 breaks. As noted here, upon application of great load, the supporting force of the stopper 91 works secondarily, in addition to the supporting force of the wire 6, thus preventing the fall of the lower door 3 or the luggage. Further, the stopper 91 shares the load imposed on the wire 6, thus obviating the need to impart more strength than required to the wire 6 or the hinge 7. As a result, cost reduction can be achieved for the members, and downsizing, simplification, and weight reduction can also be achieved for the members. Their appearances can also be improved.

The invention thus described, it will be obvious that the same may be varied in many ways. For example, the provision of the stop for the wire is described as a means of restraining the paying-out of the wire. However, this is not limitative, and the wire may be directly welded and fixed to the vehicle body, the take-up means, or the central shaft of the take-up means. Alternatively, the stop may be mounted on the wire by caulking, or the end of the wire may be folded back, and a cylindrical stopper may be provided in a hole formed by the folded-back portion. Such variations are not to be regarded as a departure from the spirit and scope of the invention, and all such modifications as would be obvious to one skilled in the art are intended to be included within the scope of the following claims.

What is claimed is:

1. An opening and closing apparatus of a vehicle, comprising:
   an opening and closing member for opening and closing an opening portion of a vehicle body;
   a lower hinge pivotally supported in a lower edge portion of the opening portion for supporting the opening and closing member to be pivotable; and a cover member disposed below the opening and closing member placed in a closed state for covering a pivot support portion of the lower hinge from behind, wherein the lower hinge has a pivoting portion supported to be pivotable about the pivot support portion, the pivoting portion has a bent shape so that when the opening and closing member is in an open state, the pivoting portion straddles the cover member, and the opening and closing member is located rearwardly of the cover member in a longitudinal direction of the vehicle body, and an uppermost site of the pivoting portion is located at a position not higher than an upper surface of the opening and closing member when the opening and closing member is in the open state, wherein a sheet member is provided for covering the upper surface of the opening and closing member and the lower edge portion of the opening portion of the vehicle body when the opening and closing member is in the open state.

2. An opening and closing apparatus of a vehicle, comprising:

an opening and closing member for opening and closing an opening portion of a vehicle body;

a lower hinge pivotally supported in a lower edge portion of the opening portion for supporting the opening and closing member to be pivotable; and a cover member disposed below the opening and closing member placed in a closed state for covering a pivot support portion of the lower hinge from behind, wherein the lower hinge has a pivoting portion supported to be pivotable about the pivot support portion, the pivoting portion has a bent shape so that when the opening and closing member is in an open state, the pivoting portion straddles the cover member, and the opening and closing member is located rearwardly of the cover member in a longitudinal direction of the vehicle body, and an uppermost site of the pivoting portion is located at a position not higher than an upper surface of the opening and closing member when the opening and closing member is in the open state, wherein a wire having an end mounted on the vehicle body and another end mounted on the opening and closing member is further provided for supporting the upper surface of the opening and closing member in the open state to be nearly horizontal, the lower hinge has a stopper for restraining rotation of the pivoting portion, when load imposed on the opening and closing member in the open state is not greater than a predetermined value, the wire supports the opening and closing member, and when the load is greater than the predetermined value, the stopper restrains the pivoting portion of the lower hinge to support the opening and closing member.

3. The opening and closing apparatus of a vehicle according to claim 2, wherein the stopper is provided at a position close to a rotating shaft portion of the lower hinge, and contacts the pivoting portion to restrain the rotation of the pivoting portion.

4. The opening and closing apparatus of a vehicle according to claim 2, wherein taken-up means for taking up the wire when the opening and closing member is closed is provided in the vehicle body.

* * * * *